Feb. 2, 1943.  R. H. HILL  2,310,081
GENERATOR TRANSMISSION
Filed March 21, 1941  6 Sheets-Sheet 1

INVENTOR
ROBERT H. HILL
BY
*Spencer Hardman & Fehr*
his ATTORNEYS

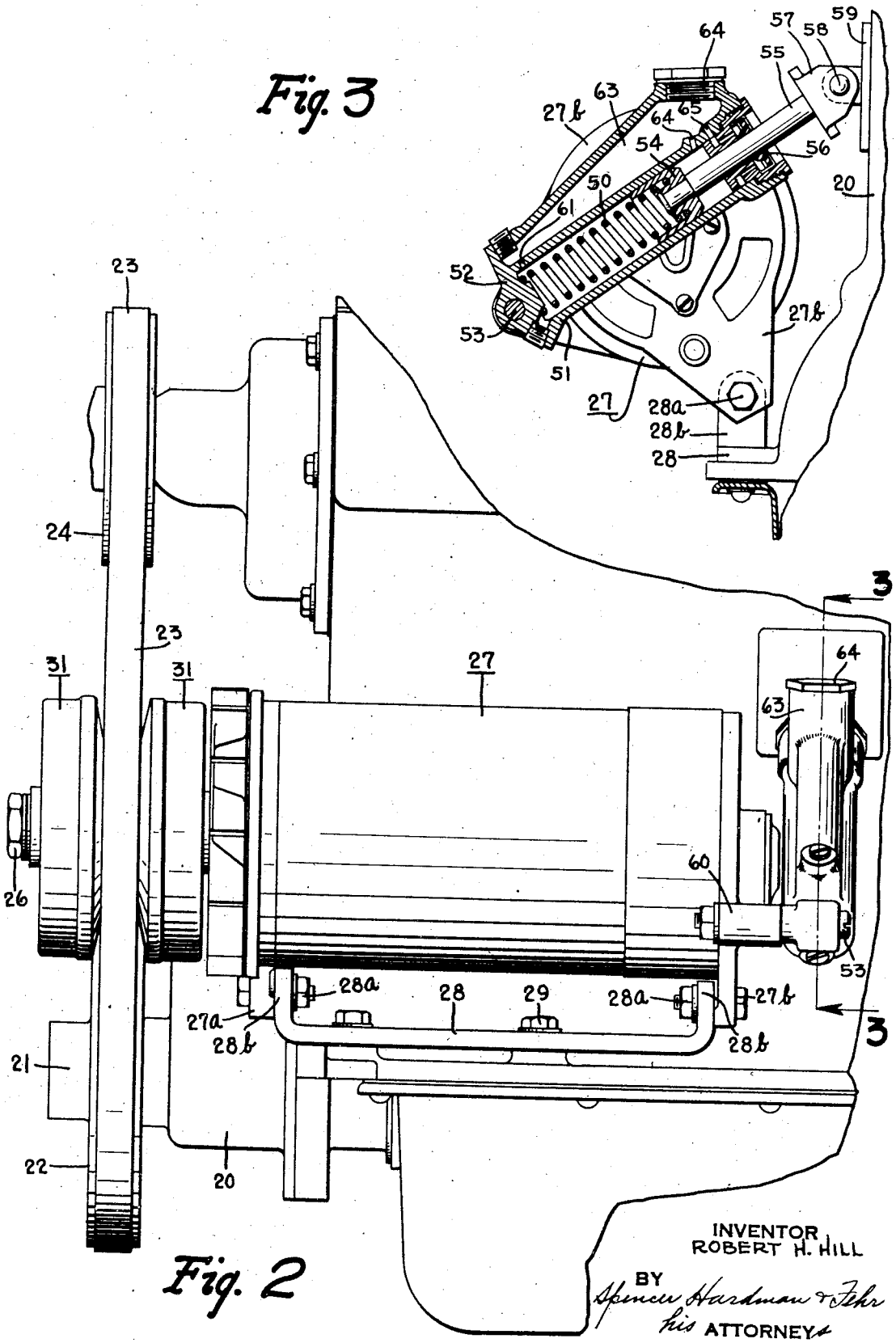

Feb. 2, 1943.                    R. H. HILL                     2,310,081
                          GENERATOR TRANSMISSION
                          Filed March 21, 1941              6 Sheets-Sheet 3

INVENTOR
ROBERT H. HILL
BY
Spencer Hardman & Fehr
his ATTORNEY

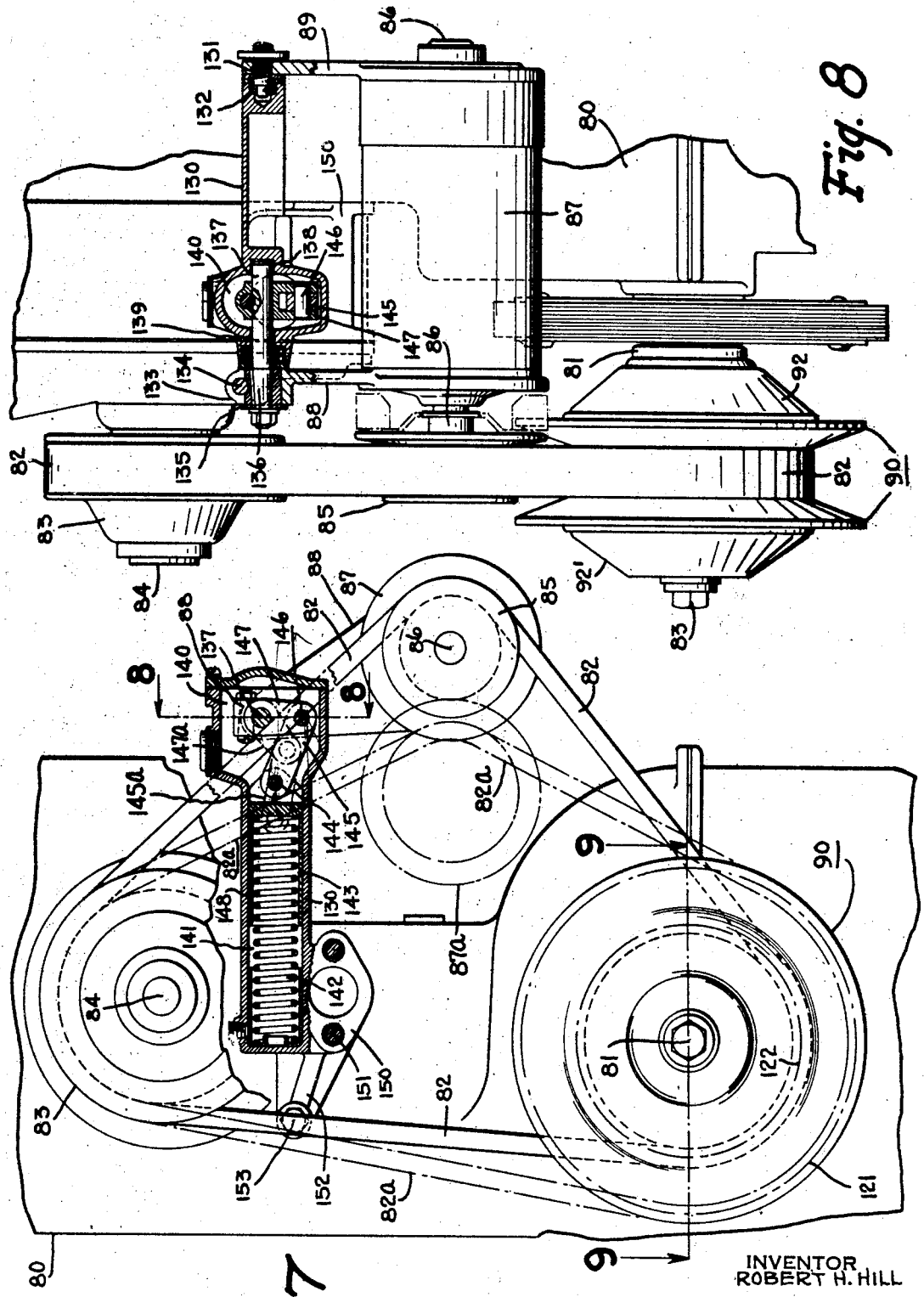

Feb. 2, 1943.   R. H. HILL   2,310,081
GENERATOR TRANSMISSION
Filed March 21, 1941   6 Sheets-Sheet 5

INVENTOR
ROBERT H. HILL
BY
ATTORNEYS

Patented Feb. 2, 1943

2,310,081

UNITED STATES PATENT OFFICE 2,310,081

GENERATOR TRANSMISSION

Robert H. Hill, Anderson, Ind., assignor to General Motors Corporation, Detroit, Mich., a corporation of Delaware Application March 21, 1941, Serial No. 384,455

8 Claims. (Cl. 74—230.17)

This invention relates to the control of the speed of electric generators driven by a variable speed prime mover and more particularly to generators for automotive vehicles.

It is an object of the present invention to provide for driving the generator at such speed when the vehicle speed is low that the generator will charge the battery and supply current for ignition, lighting and for accessories; and, when the vehicle speed is high, the generator speed will be maintained within safe limits. In the disclosed embodiments of the invention this object is accomplished by providing a belt and pulley transmission between the engine and the generator, said transmission including an automatic two-speed pulley which automatically changes its effective diameter when a certain engine speed is reached. By using such a pulley the generator may be driven at a high speed ratio during the low speed operation of the vehicle, and at a low speed ratio at high speed operation of the vehicle. Since there is a change in effective pulley diameter it is necessary that a belt tightener be provided in order to keep the belt taut under all driving conditions. In this connection it is a further object of the invention to utilize the weight of the generator itself to keep the belt taut. Therefore the generator is mounted on a swinging frame so that the force of gravity acting upon the generator may be utilized to take the slack out of the belt. As the generator frame swings upon its pivot, the force of gravity effective to keep the belt taut will vary. To compensate for this variation in the effect of gravity there is provided a spring which cooperates with the generator frame in such manner that, as the effect of gravity decreases the resistance of the spring increases and vice versa. In this way the driving belt is kept practically uniformly taut, although the effective diameter of the variable speed pulley may change. A further object of the invention is to prevent "whipping" of the belt or too rapid movement of the belt during its change in position relative to the axis of the variable speed pulley and to provide for the crawling of the belt along the pulley flange surfaces. This object is accomplished by means for retarding change of position of the belt relative to the axis of the variable speed pulley through the use of a dash-pot having one or more fluid flow restricting passages and by taking advantage of the inertia of the generator which is effective to delay the starting of the change of belt position.

Further objects and advantages of the present invention will be apparent from the following description, reference being had to the accompanying drawings, wherein a preferred embodiment of the invention is clearly shown.

In the drawings:

Fig. 2 is a side view of the generator and drive shown in Fig. 1.

Fig. 3 is a sectional view on the line 3—3 of Fig. 2.

Fig. 7 is a front view of a generator drive including a belt passing around a plain generator pulley, a plain fan shaft pulley and a variable speed pulley on the engine crank shaft.

Fig. 8 is a side view of the generator drive shown in Fig. 7, the part in section being taken on the line 8—8 of Fig. 7.

Figure 9:
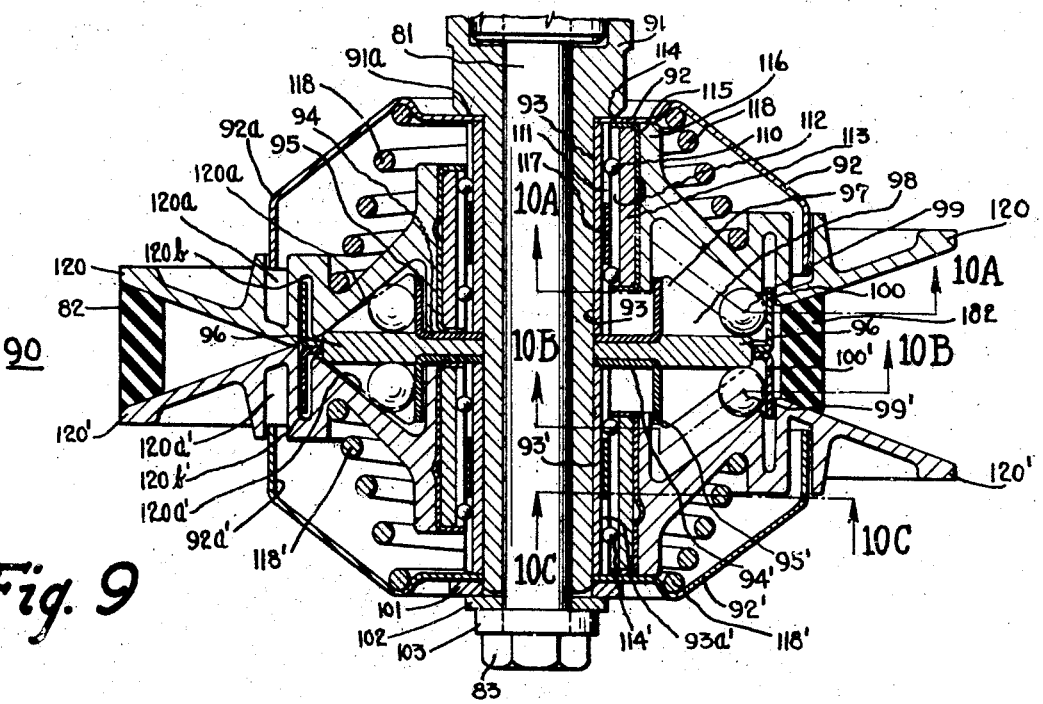
Fig. 9 is a longitudinal sectional view of the pulley taken substantially on the line 9—9 of Fig. 7. The left half of Fig. 9 shows the condition of the pulley when the engine is operating at low speed; and the right hand half of Fig. 9 shows the condition of the pulley when the engine is operating at high speed.
Figure 10:
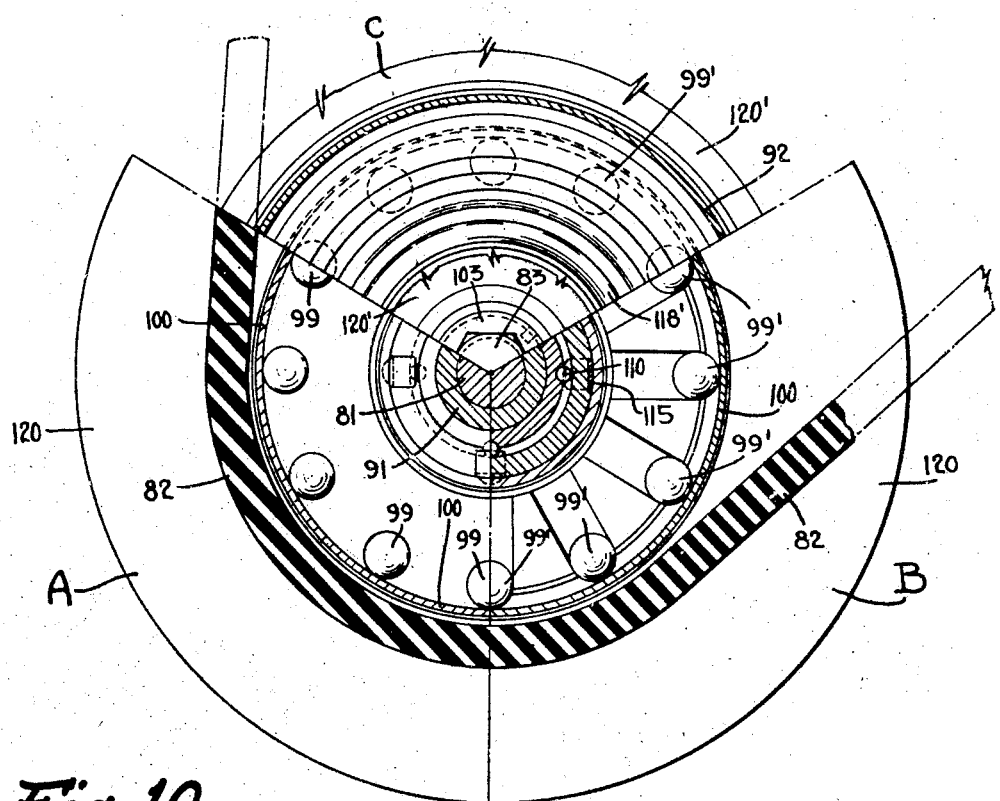

Fig. 10 is a composite cross sectional view taken on different section planes of Fig. 9. The left hand segment marked A of Fig. 10 is taken on the line 10A—10A of Fig. 9. The right hand segment marked B of Fig. 11 is taken on the line 10B—10B of Fig. 9, and the upper segment C of Fig. 10 is taken on the line 10C—10C of Fig. 9.

Figure 11:
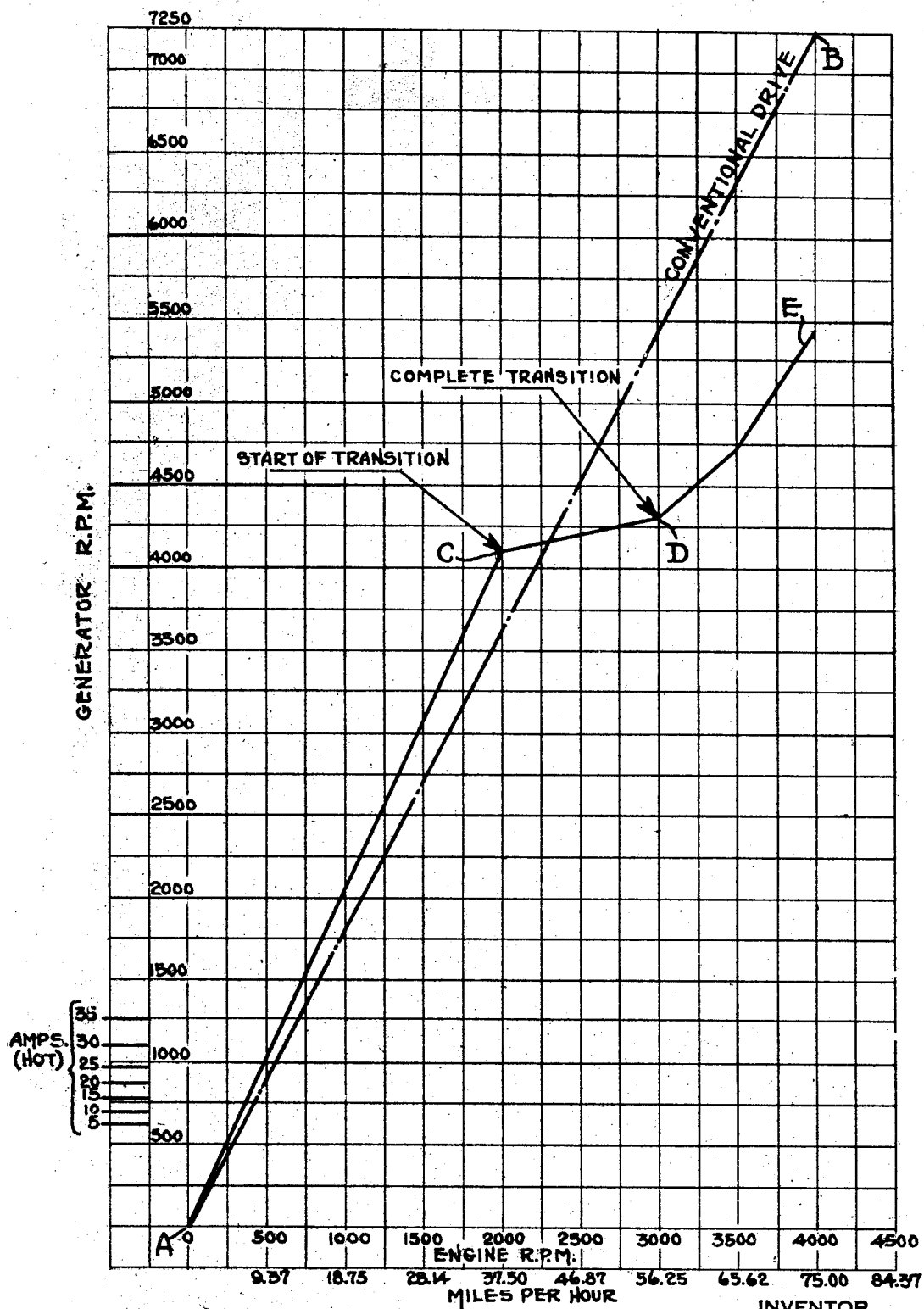

Fig. 11 is a chart illustrating the performance of a generator when driven by a variable speed pulley embodying the present invention.

Figure 1:
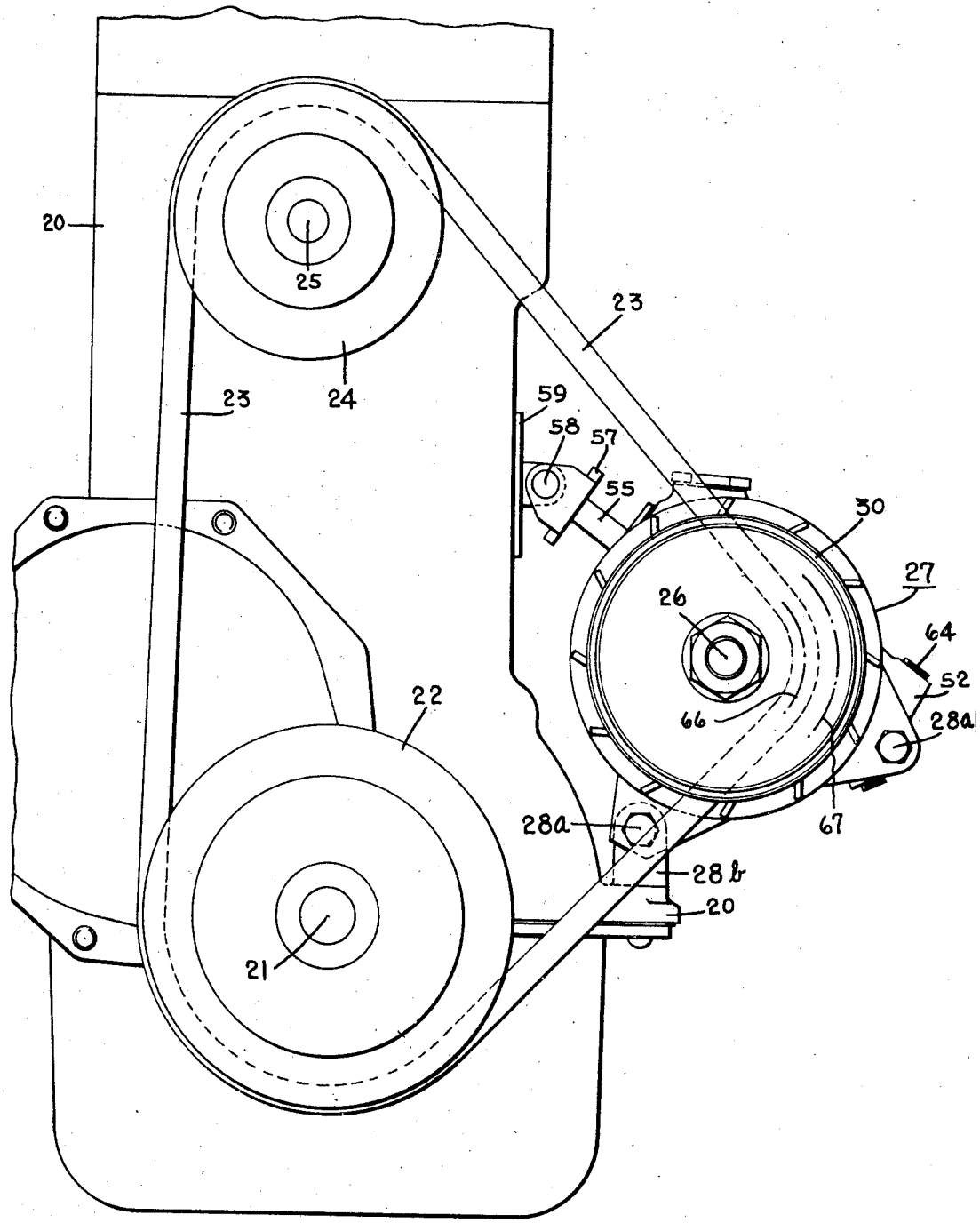
Fig. 1 is a front view of the engine and generator showing a belt drive from a pulley on the engine crank shaft and passing around a pulley on the fan and pump shaft and around a variable speed pulley on the generator shaft.

Referring to Fig. 1, an engine 20 with a crank shaft 21 drives a plain pulley 22 for receiving a belt 23 which passes around a plain pulley 24 connected with the fan and pump shaft 25. The belt passes also around a variable speed pulley 30 attached to the shaft 26 of a generator 27 having end frames 27a and 27b pivoted on screws 28a supported by ears 28b provided by bracket 28 attached by screws 29 to the frame of the engine 20.

Figures 4, 5:
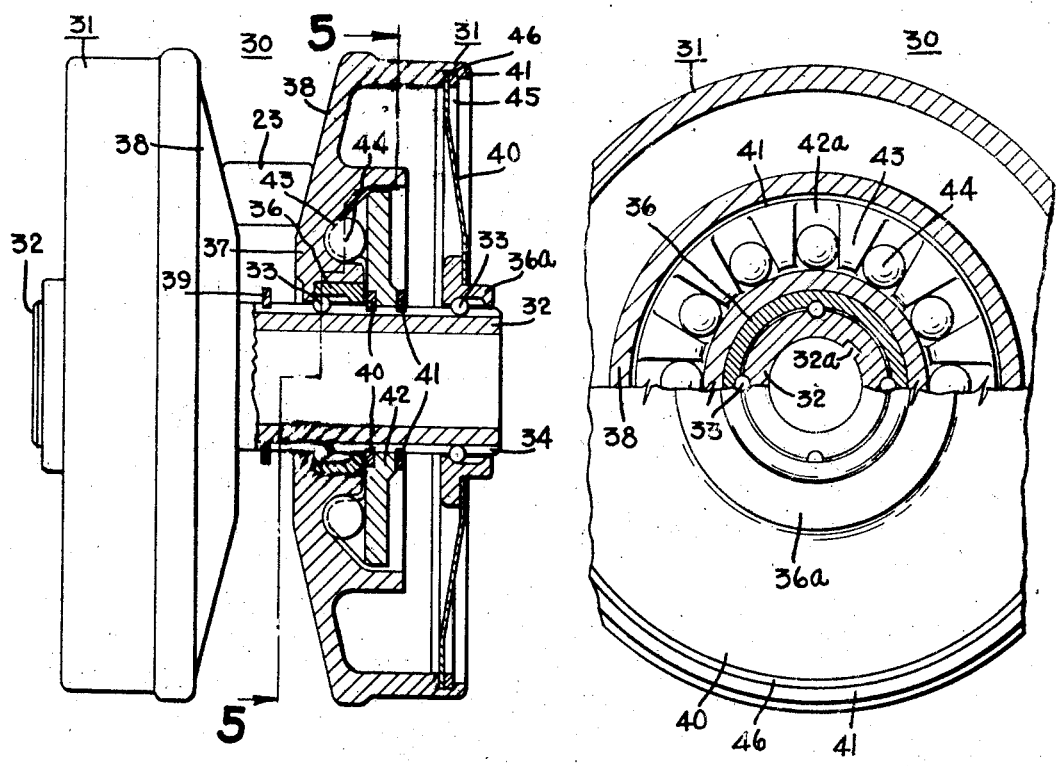
Fig. 4 is a side view partly in longitudinal section of the variable speed pulley shown in Figs. 1 and 2.
Fig. 5 is an end view partly in section of the pulley shown in Fig. 4, the sectional part being taken on the line 5—5 of Fig. 4.
Figure 6:
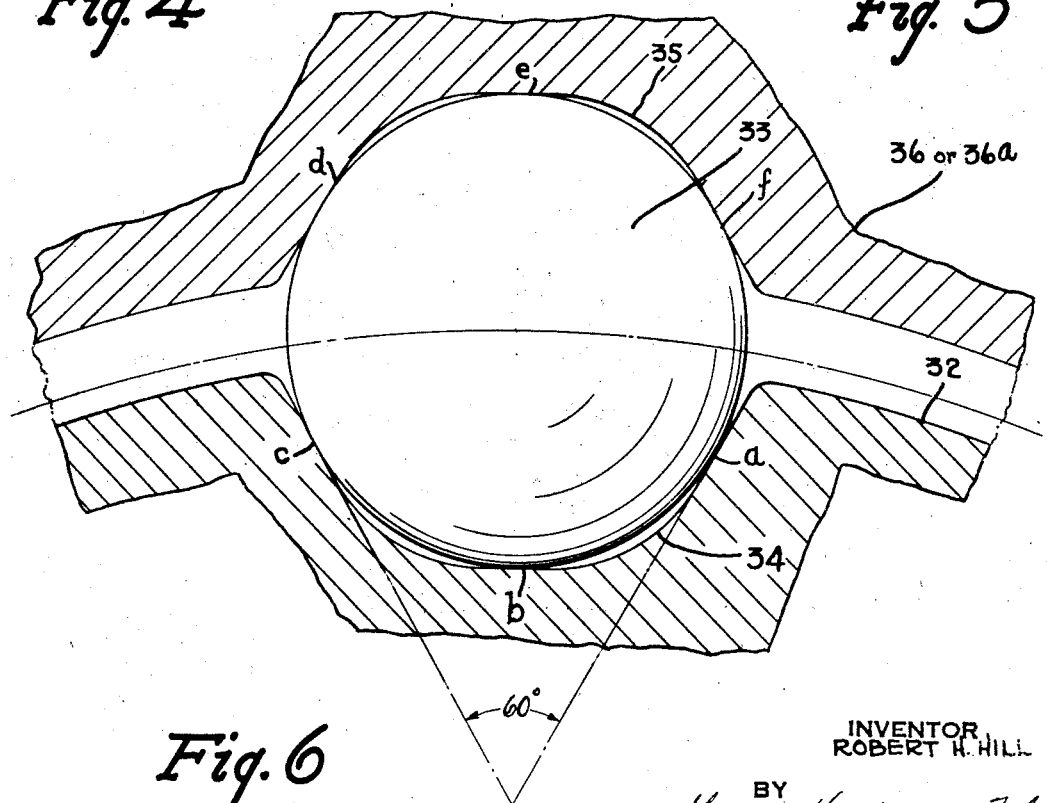
Fig. 6 is a diagram on a large scale of one of the ball bearing splines included in the pulley shown in Figs. 4 and 5.

The pulley 30 will now be described with reference to Figs. 4, 5 and 6. Pulley 30 comprises two similar flange units 31, each slidably mounted on a tubular shaft 32 and splinedly connected therewith by ball bearing splines 33. One of the ball bearing splines is shown in enlarged scale in Fig. 6. The ball bearings 33 are received by longitudinal groove 34 in shaft 32 and by longitudinal groove 35 in a part 36 or 36a. It will be noted that the grooves 34 and 35 are so shaped that each ball engages a groove in three places, namely: at points a, b, c, d, e and f as shown in Fig. 6; in other words each ball has a three-point contact with the side walls of each groove which receives it. This construction insures ease of motion while providing for rigidity of construction. The shaft 32 is provided with one or more splines or keyways 32a each adapted to receive a key or a spline fixed to the shaft 26 of the generator 27. The ball bearing engaging part 36 is an annular member received by the hub 37 of the pulley disc or pulley flange body 38. Movement of the flange 38 longitudinally or axially is limited by stops 39 and 40, which are in the form of resilient split washers which are snapped into annular grooves provided by shaft 32. There is also another spline washer 41 fitted into a groove in the shaft 32 and spaced such a distance from washer 40 as to confine a plate 42 having radially extending recesses 42a or notches located between triangular shaped bosses 43. Each recess 42a receives a ball 44 which is confined between the plate 42 and the flange 38. When the speed of shaft 32 is low, the balls 44 occupy the position shown in Fig. 4. The belt 23 then may occupy a position closer to the axis of shaft 32. When the speed of the shaft 32 increases to a certain value, the balls 44 in both of the flange assemblies 31 fly outwardly to cause the flanges 38 to be brought closer together, thereby crowding the belt 23 to a position more remote from the axis of the pulley 30. In this way the ratio of drive between the engine and generator is changed from a high gear ratio drive to a low gear ratio drive when a certain engine speed is attained. In order that each pulley section 31 will be supported by the shaft 32 without any cocking or binding, each pulley section is provided with two sets of ball bearing splines. One set has already been described with reference to part 36. Part 36a is splinedly connected with shaft 32 in the same manner as part 36. Part 36a supports a disc 40 fitting against a shoulder 40a provided by the annular flange 41 of flange body 38. A resilient split ring 45 which snaps into a groove 46 holds the disc 40 in position.

Referring to Figs. 1, 2 and 3, the belt 23 is kept taut by two forces, namely: (1) force of gravity acting upon the generator 27 tending to rotate it about the axis provided by bolts 28a in a counter-clockwise direction as viewed in Fig. 3 and clockwise in Fig. 1; (2) by the action of a spring 50 enclosed in a cylinder 51. The spring 50 is confined between the closed end 52 of the cylinder and a piston 54 attached to a piston rod 55 passing through a stuffing box 56, fixed at its upper end to a clevis 57 connected by pin 58 with a bracket 59 attached to the frame of the engine 20. The force of the spring 50 is transmitted to the generator end frame 27b through a screw 53 passing through the closed end wall 52 of cylinder 51 and through a tubular boss 60 provided with end frame 27b. The cylinder is provided with ports 61 and 62 leading into a chamber 63; therefore the piston and cylinder cooperate to provide a dashpot to retard the swinging movement of the generator. The dashpot action may be increased by the use of a hydraulic liquid within the cylinder. This liquid may be introduced into the chamber 63 and the cylinder 51 by pouring it into a threaded opening which, after filling, is closed by a plug 64. Passages 65 provide for the return to the reservoir 63 of any liquid which escapes into the packing or stuffing box 56.

It should be noted in particular that the force exerted by the spring 50 supplements the force of gravity acting upon the generator 27 in such way as to keep the belt 23 practically uniformly taut for the different positions of the pulley 30. When the engine speed is low, the belt 23 will engage the pulley 30 on a pitch circle of relatively small diameter as represented by the dot-dash circle 66 in Fig. 1. Under these conditions the force of gravity acting upon the mass supported by the bracket 28 in Fig. 3 will be relatively great while the effectiveness of the spring 50 is relatively small, the spring 50 then being somewhat expanded. As the engine speed increases, at a certain engine speed the centrifugal force acting upon the balls 44 of pulley 30 will be sufficient to overcome the forces exerted by gravity and by the spring 50 and the balls 44 will move outwardly from the shaft 26 to force the belt 23 to engage the pulley 30 on a pitch circle of larger diameter as represented by the dot-dash line 67 in Fig. 1. Since the length of the belt remains fixed, the generator must swing counter-clockwise in Fig. 1 or clockwise in Fig. 3. As the generator thus swings, the force of gravity acting upon the mass pivotally supported by the bracket 28 will decrease while the force exerted by spring 50 increases so that finally a balance will be established. The rate of increase of effectiveness of spring 50 is commensurate with the rate of decrease of the effect of gravity; therefore the total force acting upon the belt 23 to keep it taut remains practically constant although the effective pitch diameter of the pulley 30 may change.

The second form of the present invention will now be described with reference to Figs. 7 to 10.

In Fig. 7 an engine 80 drives a crank shaft 81 which drives a variable speed pulley 90 which receives a belt 82 passing around a plain pulley 83 fixed to the shaft 84 of the fan and pump and also around a plain pulley 85 on the shaft 86 of a generator 87 having end frames 88 and 89 which are pivotally supported in a manner to be described after describing the construction of pulley 90.

Referring to Figs. 9 and 10, the engine shaft 81 drives a tubular shaft 91 fixed to engine shaft 81 by screw 83. The shaft 91 directly supports and drives the following members, reading from top to bottom in Fig. 9: a spring housing member 92, a bearing inner race 93, a disc 94 having an annular flange 95, a ball retainer and guide disc 96 having spaced triangle shaped bosses 97 defining grooves 98 for receiving balls 99, another sheet metal disc 94' having an annular flange 95', a second ball bearing inner race 93', a second spring housing member 92'. All of these parts are clamped against a shoulder 91a of the shaft 91 by the screw 83, there being coacting washers 101, 102 and 103 located between the head of screw 83 and the spring housing member 92'.

The parts which are supported by bearing inner race 93 are eight bearing balls 110 arranged in four groups of two each. Each pair of bearing balls 110 is received by a longitudinal groove 111 in race member 93. The shape of this groove is the same as indicated at 34 in Fig. 6. Each pair of balls 110 is received by longitudinal groove 112 (shaped as indicated at 35 in Fig. 6) in an outer race member 113 confined between the deformable flanges 114 of a shell 115 fixed to the hub 116 of a pulley flange 120. The two balls 110 associated with each set of longitudinal grooves 111 and 112, are maintained in spaced relation by a resilient split metal band 117 snapped into a groove provided by the inner bearing race member. The pulley flange 120 is supported upon the shaft 91 at two spaced points by the bearing balls or ball bearing splines which provide for rigidity of construction and for freedom of movement.

The speed responsive balls 99 are normally located in contact with the flange 95 of disc 94 as shown in the left half of Fig. 9. A coil spring 118 located between the spring housing 92 and the pulley flange 120 maintains said flange in engagement with the disc 96, thus causing the fan belt 82 to engage said disc 120 and its companion disc 120' on a pitch circle of relatively large radius as represented by dot-dash line circle 121 in Fig. 7. The flange 120' and the parts associated therewith are identical respectively with flange 120' and parts associated therewith. These similar parts are labeled respectively with the corresponding numbers of the parts already described, a prime being affixed to each number. For example, the two springs 118 and 118' cooperate together to urge pulley flanges 120 and 120' toward the fixed disc 96 as shown in the left half of Fig. 9. When the engine speed increases the centrifugal force upon the balls 99 and 99' cause them to move outwardly into the position shown in the right half of Fig. 9. As the balls move outwardly they engage inclined surfaces 120a and 120a' of the flanges 120 and 120', thereby causing the flanges 120 and 120' to be spread apart as shown in the right half of Fig. 9, thereby permitting the belt 82 to move to a pitch circle of lesser radius, as represented by dot-dash line circle 122 in Fig. 7. Since the effective pulley diameter of pulley 90 decreases as engine speed increases and since the pulley 90 is the driving member of the transmission between the engine and generator, the generator will be driven at a lower ratio of speed during the higher range of engine speeds.

Flanges 92a and 92a' of spring covers 92 and 92' cooperate with annular grooves 120a and 120a' of flanges 120 and 120' and flanges 100 and 100' cooperate with annular grooves 120b and 120b', and flanges 95 and 95' cooperate with the hubs 116 and 116' of the flanges 120 and 120' in order to hinder the entrance of dirt into the interior of the pulley.

The mounting of the generator so that it may be used to keep the belt 82 taut will now be described with reference to Figs. 7 and 8. The generator end frames 88 and 89 provide arms by which the generator is pivotally supported upon a bracket 130. The arm 89 carries a trunnion screw 131 journalled in a bearing 132 provided by bracket 130. The arm 88 is provided with a clamping hub 133 cooperating with a screw 134 to clamp the arm 88 around a bushing 135 which is keyed to the tapered end 136 of a shaft 137, journalled in bearings 138 and 139. The shaft 137 passes through a housing 140 provided by bracket 130. Housing 140 provides a cylinder 141 for enclosing a spring 142 and a piston 143 connected by pin 144, link 145, pin 146 and arm 147 with shaft 137. The piston and cylinder cooperate together to provide a dashpot effect. To provide a dashpot bleeder, the piston 143 has a longitudinal groove 148 of relatively small dimensions. In order to secure the bracket 130 including the cylinder 140 to the engine frame, the bracket 130 is made integral with a water conduit fitting 150 adapted to be inserted between the engine frame and the pump. The pump (not shown) and fitting 150 are secured to the engine frame by screws 151. In order to brace the structure still further, the fitting 150 is integral with an arm 152 through which a screw 153 passes to secure the bracket 130 to the engine frame.

During low speed operation of the engine the belt 82 is located in the dot-dash line 82a in Fig. 7, the belt engaging the pulley 90 on pitch circle 121. The generator 87, at the position indicated by circle 87a in Fig. 7, is being driven through a high speed ratio drive. When the engine is running at high speed the belt 82 will engage the pulley 90 at the flange circle 122 and the generator will be driven through a low speed ratio drive. Under the latter condition, the belt is in the full line position 82 and the generator is in the full line position 87. The force of gravity acting upon the generator 87 in the full line position tends to move the generator clockwise in Fig. 7, thereby tending to decrease the tension on the belt; but the force of gravity is overbalanced by the force exerted by spring 142 as shown in Fig. 7. The linkage between piston 143 and shaft 137 is in a position whereby the spring 142 can act most effectively to turn the shaft 137 in a counter-clockwise direction, thereby urging the generator 87 in a counter-clockwise direction to keep the belt taut. As the speed of the engine decreases to permit the generator 87 to move from the full line position to the dot-dash line position 87a, the force of gravity acting upon the generator 87 will become effective, after the generator center of gravity has swung to the left of a vertical line dropped from the axis of shaft 137, or in other words when the generator starts to ascend. The gravity then increases its effectiveness to keep the belt taut. Although the spring 142 is still effective to keep the belt taut, its effectiveness is less than when the generator is in the position shown in full lines. It would seem that the spring 142 should be more effective when the generator is in the position 87a because the spring has greater compression. However, the leverage of the spring is much less because the link 145 has been moved into the dot-dash line position 145a and the arm 147 into the dot-dash line position 147a as shown in Fig. 7. In the form shown in Figs. 7 and 8 as well as in the form shown in Figs. 1, 2 and 3, as force of gravity increases, the force of the spring decreases and vice versa in order that the tautness of the belt will be practically uniform under all operating conditions.

Referring to Fig. 11, which is a chart showing the relation of generator speed to engine R. P. M. and vehicle speed in M. P. H., line A—B represents the relation of generator R. P. M. to vehicle speed when the conventional one-speed drive is used. It will be seen that when the vehicle speed is around 40 M. P. H. the generator speed would be around 4000 R. P. M.; and when the vehicle speed is around 75 M. P. H. the generator speed will be 7250 R. P. M. which is a very excessive speed for an automobile generator. When the generator is driven by transmission constructed in accordance with the present invention, the relation of generator speed to engine speed and to vehicle speed when the generator is being driven through the high gear ratio drive is represented by the line A—C. At point C the vehicle speed is 37.5 M. P. H. and engine speed is about 4100 R. P. M. During the increase of vehicle speed from 37.5 to 56.25 M. P. H. there is a period of transition from the high ratio drive to the low ratio drive. This transition period is represented by the line C—D. It is apparent that although the vehicle speed is increased from 37.5 to 56.25 M. P. H. the generator R. P. M. has increased only from 4100 to about 4300. The line D—E represents the relation of generator speed to vehicle speed while the generator is being driven through the low gear ratio drive. When the vehicle has attained a speed of 75 M. P. H. the generator speed is about 5450 R. P. M. as compared with 7250 R. P. M. with the conventional one-speed drive. The variable speed drive not only protects the generator against excessive speed, but makes possible the use of a generator which will build up to full output at a low speed. The chart shows that the generator will have an output of 5 amps. at about 12 M. P. H. vehicle speed. Therefore the storage battery will be kept charged although the vehicle is being driven at a relatively low speed. In the transmissions embodying the present invention, opposing forces are operating to effect a change of position of the belt with respect to the axis of the variable speed pulley. In the transmission of Figs. 1 to 5, a component of centrifugal force tending to force the pulley flanges 38 together is opposed by the belt tightener which functions by virtue of the force of spring 50 and the force of gravity acting upon the generator 27. When the centrifugal force component overcomes the belt tightener forces, the variable speed pulley 30 moves to the left in Fig. 1, and the belt 23 contacts the pulley at a larger diameter. In effect, the belt 23 moves out or away from the axis of the pulley 30. When the belt tightener forces are greater than the centrifugal force component, the belt 23 moves in toward the axis of the pulley 30. In this transmission, change of position of the belt with respect to the variable speed pulley is dependent upon the existence of a differential between belt-tightener effect and the effect of centrifugal force. In the transmission of Figs. 7 to 10, the change of position of belt 82 with respect to pulley 90 is dependent upon the existence of a differential between the effect of springs 118 and 118' of the pulley 90 and the combined effect of centrifugal force and of the belt tightener.

In both forms of the transmission disclosed herein, means are provided for retarding the movement of the belt with respect to the axis of the variable speed pulley in order to avoid whipping the belt out or in when abrupt changes in speed occur. The retarding means comprises the dash pot with fluid flow-restricting passages (orifices 61, 64 of Fig. 3, or groove 148 of Fig. 7) and the effect of the inertia of the pivotally mounted generator which functions as a belt tightener element. By retarding changes in its position the belt is permitted to crawl naturally along the pulley flanges; and consequently the belt is subjected to less wear than in the case where the belt is allowed to whip in or out with sudden changes in speed.

While the embodiments of the present invention as herein disclosed constitute preferred forms, it is to be understood that other forms might be adopted, all coming within the scope of the claims which follow.

What is claimed is as follows:

1. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges with which the belt engages and speed responsive means for changing the diameter of the belt engaging surfaces of said flanges, means for keeping the belt practically uniformly taut as said diameter varies said belt-tensioning means including the generator and a structure for so pivotally supporting the generator that the force of gravity may act upon the generator, at least in some positions thereof to tighten the belt, and including a spring for urging the generator in a direction to tension the belt, and including means for transmitting the force of the spring to the generator, said means being responsive to the position of the generator for increasing the ability of the spring to urge the generator into belt-tightening position as the generator moves into a position wherein the force of gravity is less effective to maintain the generator in belt-tightening position and means for retarding change of position of the belt relative to the axis of the variable speed pulley, said means comprising a dash-pot connected with the generator and providing a fluid flow-restricting passage whereby the rate of pivotal movement of the generator is reduced, and said means including also the generator which, by virtue of its inertia, delays the starting of the change of position of the belt.

2. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges with which the belt engages and speed responsive means for changing the diameter of the belt engaging surfaces of said flanges, means for keeping the belt practically uniformly taut as said diameter varies, said means including the generator and a structure for pivotally supporting the generator so that the force of gravity acting upon the generator may be operable to tension the belt, and including a spring for applying a force to tension the belt, and including means for transmitting the force of the spring to the generator, said means being responsive to change in position of the generator for causing the stress in the spring to increase as the generator moves in such direction as to cause a decrease in the force moment arm of the force of gravity acting upon the generator in such direction as urge the generator toward belt-tightening position and means for retarding change of position of the belt relative to the axis of the variable speed pulley, said means comprising a dash-pot connected with the generator and providing a fluid flow restricting passage whereby the rate of pivotal movement of the generator is reduced and said means including also the generator which, by virtue of its inertia, delays the starting of the change of position of the belt.

3. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges, and speed responsive means for changing the diameter of the belt engaging surfaces of said flanges, means for keeping the belt practically uniformly taut as said diameter varies, said means including the generator and a structure providing a pivotal support for the generator underneath the latter so that, as the generator tends to fall under gravity, the belt is placed under tension, a compression spring connected with the generator at a point above the pivot and connected with a fixed part, the compression of the spring increasing as the leverage (with respect to the generator pivot) of the force of gravity decreases and means for retarding change of position of the belt relative to the axis of the variable speed pulley, said means comprising a dash-pot connected with the generator and providing a fluid flow restricting passage whereby the rate of pivotal movement of the generator is reduced, and said means including also the generator which, by virtue of its inertia, delays the starting of the change of position of the belt.

4. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges and speed responsive means for changing the diameter of the belt engaging surfaces of said flanges, and means for keeping the belt practically uniformly taut as said diameter varies, said means including the generator and a structure providing a pivotal support for the generator above the latter, said generator pivot including a rotatable shaft fixed to the frame of the generator and located parallel to the generator axis, a compression spring confined between fixed and movable parts, and means for transmitting motion between said pivot shaft and said movable part engaged by the spring and so constructed and arranged that, as the effectiveness of gravity (acting upon the mass of the generator) to keep the belt taut decreases, the effectiveness of the spring to keep the belt taut increases, and vice versa.

5. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges and speed responsive means for changing the diameter of the belt engaging surfaces of said flanges, and means for keeping the belt practically uniformly taut as said diameter varies, said means including the generator and a structure providing a pivotal support for the generator above the latter, and so located that the generator swings to either side of the vertical plane of its pivot as the effective diameter of the variable speed pulley changes, a spring for resisting movement of the generator pulley closer to the other pulleys and means for transmitting force from the spring to the generator to cause it to move away from the other pulleys in order to keep the belt taut, said means being constructed and arranged so that, as the generator descends while moving toward the other pulley, the effectiveness of the spring to keep the belt taut will increase, and as the generator ascends while moving toward the other pulleys, the effectiveness of the spring to keep the belt taut will decrease.

6. A transmission for a generator driven by a variable speed engine comprising a driving pulley connected with the engine, a driven pulley connected with the generator, a third pulley, a belt conecting the three pulleys, one of the two first mentioned pulleys having axially adjustable flanges with which the belt engages and speed responsive means for changing the diameter of the belt engaging surfaces of said flanges, and means for keeping the belt practically uniformly taut as said diameter varies, said means including the generator and a structure for pivotally supporting the generator so that the force of gravity acting upon the generator may be operable to tension the belt, and including a spring for applying a force to tension the belt, and including means for transmitting the force of the spring to the generator said means including a force-multiplying mechanism, responsive to such changes in the position of the generator as cause the force of gravity acting upon the generator to become less effective to keep the belt taut, for causing an increase in the force-moment-arm of the spring, said force-moment-arm decreasing as the effect of the force of gravity is increasing.

7. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges with which the belt engages and speed responsive means for changing the diameter of the belt engaging surfaces of said flanges, and means for keeping the belt practically uniformly taut as said diameter varies, said means including the generator and a structure for pivotally supporting the generator so that the force of gravity acting upon the generator may be operable to tension the belt, and including a spring for applying a force to tension the belt, and including a piston member or transmitting the force of the spring to the generator, a cylinder member for containing a liquid and for receiving the piston and the spring, and a reservoir member also for containing liquid and for supplying the same to the cylinder member, one of said members providing a passage restricting the flow of liquid as the piston member moves, thereby retarding movements of the generator about its pivotal support and consequently retarding change of position of the belt with respect to the variable speed pulley, the starting of the change of position of the belt being delayed by virtue of the inertia of the generator.

8. A transmission for a generator driven by a variable speed engine comprising a driving pulley connected with the engine, a driven pulley connected with the generator, a third pulley, a belt connecting the three pulleys, one of the two first mentioned pulleys having axially adjustable flanges with which the belt engages, and speed responsive means for changing the diameter of the belt engaging surfaces of said flanges, means for keeping the belt taut and including the generator and a structure for so pivotally supporting the generator that the force of gravity may act on the generator and a spring for urging the generator in a direction to keep the belt taut, and means for retarding change of position of the belt relative to the axis of the variable speed pulley, said means comprising a dash pot connected with the generator and providing a fluid flow-restricting passage whereby the rate of pivotal movement of the generator is reduced, and said means including also the generator which, by virtue of its inertia, delays the starting of the change of position of the belt.

ROBERT H. HILL.